Aug. 19, 1924.
E. A. BANSCHBACH
DOUBLE BUMPER
Filed Dec. 12, 1921
1,505,365
3 Sheets-Sheet 1
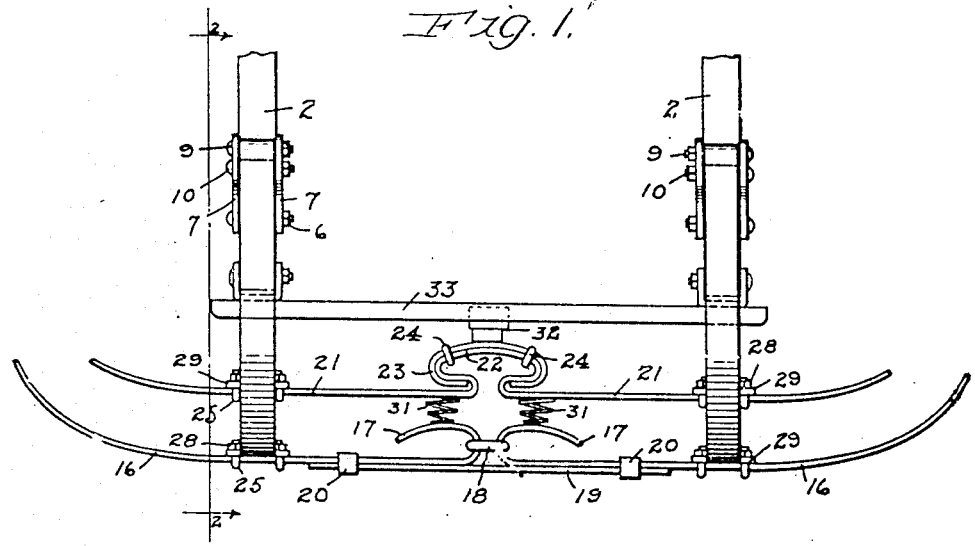
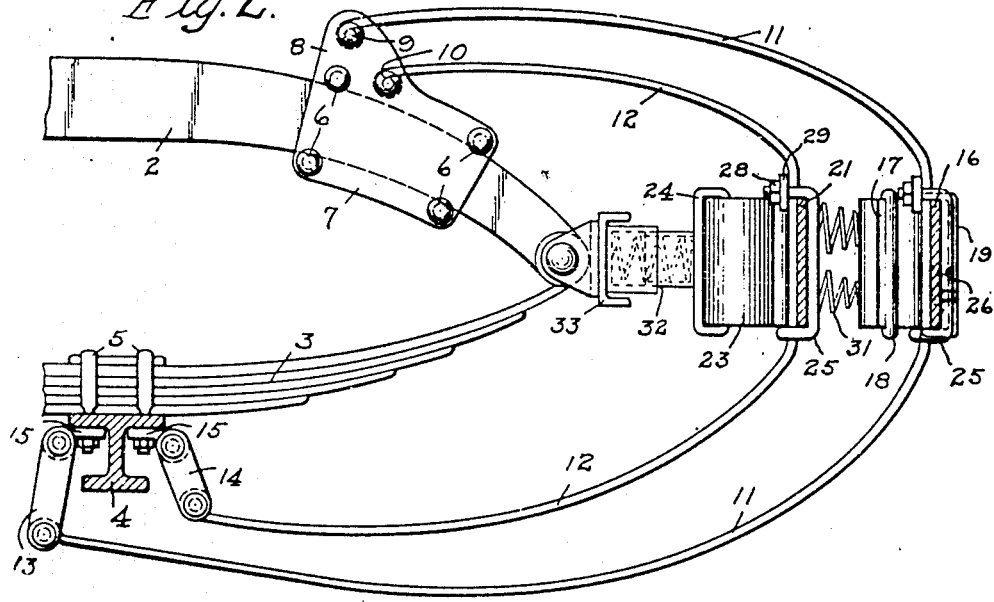
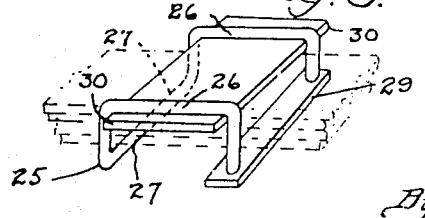
Inventor:
Edward A. Banschbach
By Kent W. Wonnell
Atty.

Aug. 19, 1924.  
E. A. BANSCHBACH  
DOUBLE BUMPER  
Filed Dec. 12, 1921  
1,505,365  
3 Sheets-Sheet 2
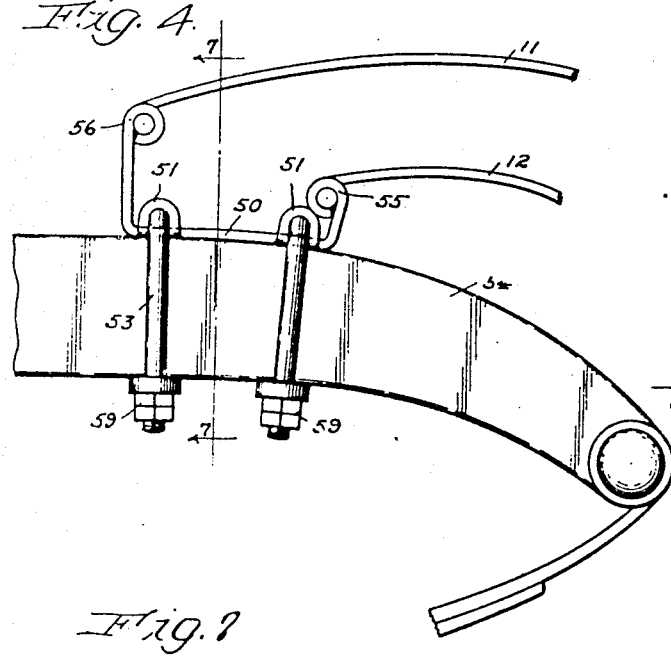
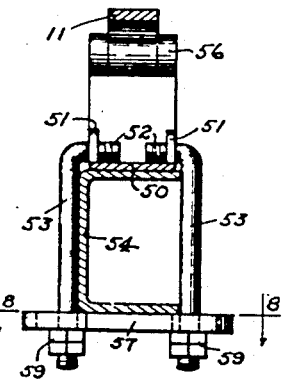
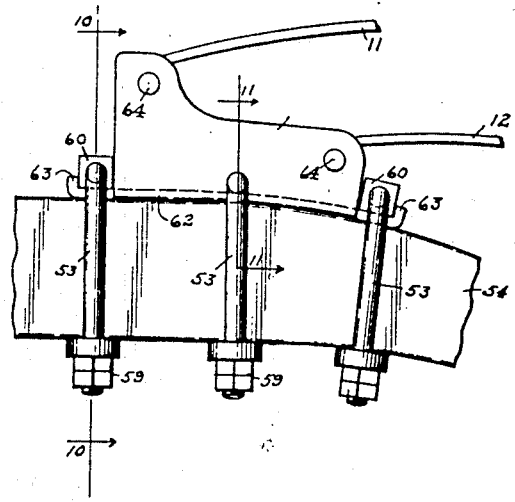
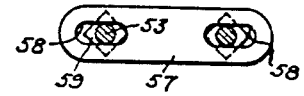
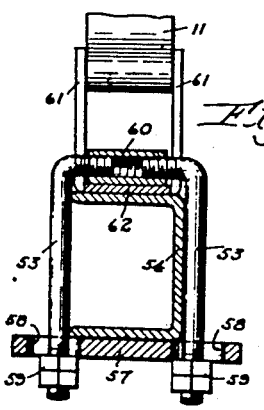
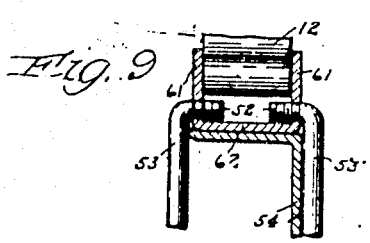
Inventor,
Edward A. Banschbach,
By Kent W. Wonnell
Atty.

Aug. 19, 1924
E. A. BANSCHBACH
DOUBLE BUMPER
Filed Dec. 12, 1921
1,505,365
3 Sheets-Sheet 3
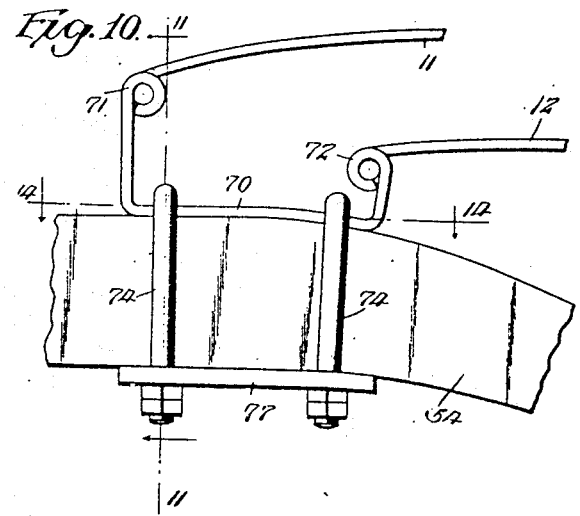
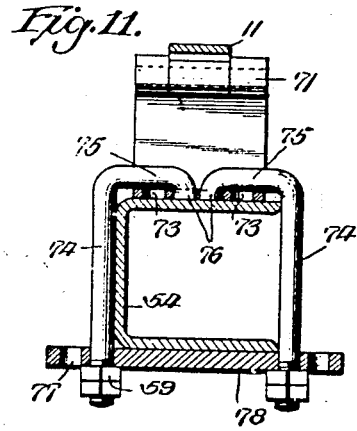
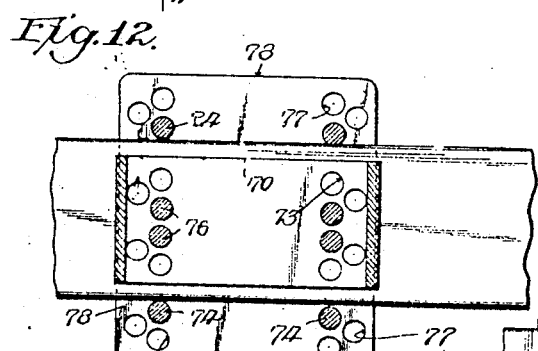
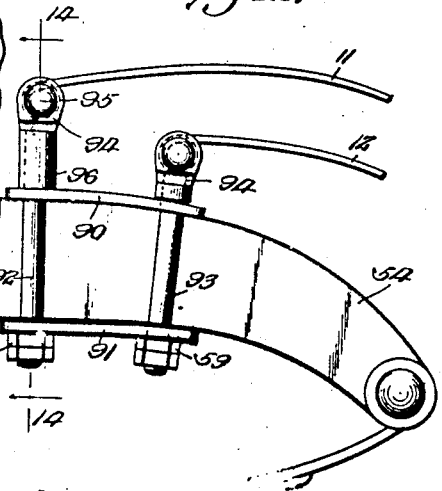
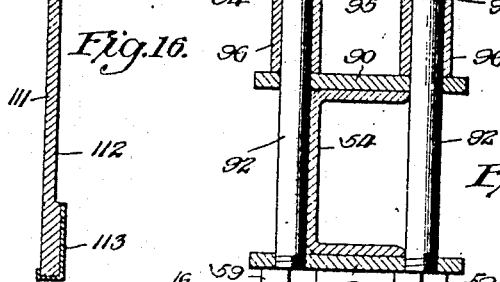
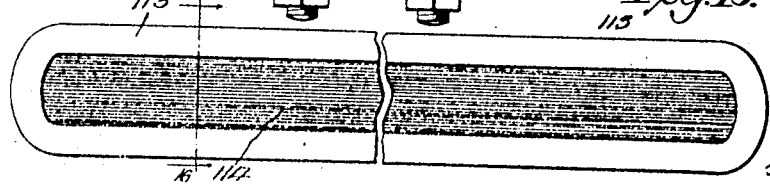
Inventor:
Edward A. Banschbach
By
Kent W. Nonnell Patented Aug. 19, 1924.

1,505,365

UNITED STATES PATENT OFFICE.

EDWARD A. BANSCHBACH, OF CHICAGO, ILLINOIS.

DOUBLE BUMPER.

Application filed December 12, 1921. Serial No. 571,634.

*To all whom it may concern:*

Be it known that I, EDWARD A. BANSCH-BACH, a citizen of the United States, residing at Chicago, in the county of Cook and State of Illinois, have invented certain new and useful Improvements in Double Bumpers, of which the following is a specification.

This invention relates to a vehicle buffer or bumper particularly designed and intended for use with automobiles, and one of the principal objects of the invention is to provide a device of this class which has a compound action, including with a guard or fender a number of resilient or resistent devices which are accumulative in their action, opposing an impact with the least shock to the vehicle itself. Other objects of the invention are to provide improved mounting means for the bumper, and improved connecting devices for the parts thereof.

In the accompanying drawings, Fig. 1 is a plan view, and Fig. 2 is a section taken on the line 2—2 of Fig. 1, of a bumper constructed in accordance with the principles of this invention; Fig. 3 is a perspective of one of the double U clamps; Fig. 4 is a side elevation of a frame clamp for a bumper of this class; Fig. 5 is a section taken on the line 7—7 of Fig. 4; Fig. 6 is a section taken on the line 8—8 of Fig. 5; Fig. 7 is a side elevation of a different form of double bumper clamp; Fig. 8 is a section taken on the line 10—10 of Fig. 7; Fig. 9 is a detail section taken on the line 11—11 of Fig. 7; Fig. 10 is a side elevation of another form of double bumper clamp; Fig. 11 is a section taken on the line 13—13 of Fig. 10; Fig. 12 is a plan section taken on the line 14—14 of Fig. 10; Fig. 13 is a side elevation of another form of double bumper clamp; Fig. 14 is a section taken on the line 19—19 of Fig. 13; Fig. 15 is a front view of a buffer plate; and Fig. 16 is a section taken on the line 24—24 of Fig. 15.

In order to have the greatest efficiency in a bumper it is desirable that such a device shall be able to withstand slight shocks or impacts, and that a reserve or emergency is available for much more severe impacts. In the present invention this is accomplished by providing a pair of bumper bars one behind the other, each backed up by a resilient device, and each supported upon long arms from the vehicle and running gear frames respectively. The vehicle frame directly supports the body of the vehicle, and the running gear frame is that which directly supports the wheels.

Referring more particularly to the drawings, a pair of vehicle side frames 2 are shown connected at the ends to leaf springs 3 mounted in the ordinary way on an axle support 4 by U-bolts 5.

Attached to each side frame by fastening bolts 6 is a pair of plates 7, each of which has an upward projection 8 in which the cross bolts 9 and 10 are mounted. These cross bolts 9 and 10 form the upper pivoting supports for the forwardly extending U-shaped members 11 and 12, one of each at each side of the frame, and the lower arms of these U-shaped members are connected by links 13 and 14 to brackets 15 attached to the axle support 4. The brackets may be secured to the support 4 by the same fastening nuts which hold the U-bolts 5 in place, and the link 13 of the outermost U-member 11 is preferably longer than the link 14 so that the member 11 will have a freer and further movement than the member 12.

Attached to the front members 11 is a bumper comprising separate side pieces 16, one attached to each U-shaped member 11 and each formed with a hooked inner end 17, the two hooked ends being connected by a closed link 18. Also extending across the junction of these two side pieces 16 is a front piece 19 loosely mounted in clips 20 one attached to each of the side pieces 16.

A single bumper member 21 is supported by the inner U-shaped members 12 which has an intermediate loop 22 reenforced by a partially closed oblong link 23 held in place over the loop by fastening clips 24. If desired, this bumper member 21 may be made in two parts separated at the center and joined the same way by the link 23.

Both of these bumpers are secured to their respective supporting members by what may be called a double U-clamp which consists of a single piece preferably of bar stock bent to form U-portions 26 connected by a cross piece 27 and the extremities being threaded to receive fastening nuts 28. By providing a cross bar 29 this U-clamp may be used to connect a number of members disposed at an angle to each other or in connection with a plate 30, as indicated in Fig. 3, a number of parallel members may be secured together. The advantage of this clamp is that it will connect flat members of this kind either at an angle or parallel to each other without reducing the strength of any of the parts, and in fact strengthening or reenforcing them.

In the present instance the bar members are at right angles to the supporting member, and in clamping them together it is only necessary to hook the cross piece 27 over the inside of one of the supporting members 11 or 12, to rock or incline the free extremities of the clamp outwardly so that the bumper members can be inserted between the U parts 26 on the opposite side of the supporting member, and then to move the free extremities inwardly binding the crossed members together so that the threaded extremities of the clamp are on the same side of the supporting member as the cross piece 27. A cross bar 29 is then placed over the threaded extremities and the fastening nuts 28 are tightened in place.

To further coordinate the double bumper action, springs 31 are inserted between the bumpers preferably bearing against the hooked end 17 of the outer bumper members and supported by them, and also engaging the outer face of the inner bumper member 21. At the rear of the link 23 of the inner bumper member a buffer device 32 preferably of the air cushion type is secured which bears against a cross plate 33 transversely pivoted at the ends of the side frames 2, allowing it to swing up and down to conform to a similar movement of the bumpers.

It will be apparent that an impact with the outer bumper will cause its movement on the supports 14 opposed by the springs 31. If the impact is a severe one the inner bumper will be correspondingly deflected and its movement will be retarded or cushioned by the air buffer device 32. Both bumpers have a free yielding movement due to the supporting links 13 and 14, and they are held in place by the upper supporting arms and the lower arm connections. It will be observed that both of these bumpers have a central division line so that either of the members 16 is separately movable on its supporting member 11 without materially deflecting the other one, and the member 21 may be deflected from the central loop 22 without materially affecting the other side. The intermediate devices 31 and 32 may be omitted if desired as the bumpers will be supported without them. The engagement of the outer bumper will not affect the inner one in such a case until the outer one is deflected sufficiently so that its parts, as for example the hooked extremities 17, engage the inner bumper, whereupon the resistant effect of the inner bumper will be added to the outer one.

In attaching a double bumper to the frame of a vehicle, a number of clamping devices may be used. It is desirable to provide a clamp which can be attached to frames of different widths so that the same clamp can be used for a number of different frames. In the construction shown by Figs. 4, 5 and 6 a plate 50 has upturned threaded lugs 51 at the sides into which threaded extremities 52 of L-shaped bolts 53 are separately inserted from the opposite sides. These threaded extremities are inserted an amount depending upon the width of a frame 54 to which the clamp is applied. The ends of the plate are bent upwardly to form hinge loops or eyes 55 and 56 for supporting members 12 and 11, and the shanks of the bolts 53 are turned downwardly below the frame 54 closely adjacent the sides thereof. Connecting the extremities of opposite bolts 53 is a cross plate or bar 57 in which are elongated slots 58 through which the bolts extend. Below the plate a number of fastening and lock nuts 59 are attached for holding the bolts in place and pressing the bar 57 tightly against the underside of the frame 54.

A somewhat similar construction is shown in Figs. 7, 8 and 9, in which pairs of end bolts 53 are threaded into opposite ends of a sleeve block 60 while an intermediate pair of bolts 53 is threaded directly into the upturned sides 61 of a top plate 62, the extremities 63 of the top plate being turned upwardly beyond the sides 61 to form a means for retaining the sleeve blocks 60 in connection with the plate 62, the bumper members 11 and 12 being pivoted upon cross bolts 64 mounted in the upturned sides 61.

A simple form of clamp is shown in Figs. 10, 11 and 12 comprising a plate 70 with upturned hinge ends 71 and 72 for supporting bumper members 11 and 12 and having a plurality of perforations 73 in the face of the plate. Bolts 74 each formed with an L-shaped extension 75 the extremity of which is an upturned end 76, are adapted to project downwardly at the sides of the frame with the extremities 76 seated in the perforation 73 of the plate and the heads of the bolts extend through corresponding perforations 77 in a plate 78 at the underside of the frame so that the bolt can be attached to frames of different widths, the same plates 70 and 78 being adapted to accommodate a number of different widths.

In the construction shown by Figs. 18 and 19 there is a top plate 90 and a bottom plate 91 above and below the frame 54. Through these plates at the sides of the frame long and short bolts 92 and 93 are inserted, the upper ends of which are provided with a headed eye 94 through which cross bolts 95 are inserted for pivotally mounting the ends of bumper members 11 and 12. Between the headed eyes and the plate, the long bolts 92 are inserted through sleeves 96 which hold their upper ends above the plate 90 and the lower ends of the bolts are provided with fastening and lock nuts 59.

One type of buffer plate 111 is shown in Figs. 15 and 16, which is preferably formed with a central depression or recess 112 which may be corrugated or roughened in any distinctive manner. The edge is preferably left smooth to receive a thin strip 113 of metal, such as brass, aluminum, or the like, or any material which will take or retain a bright finish or polish, the object being to provide a metal strip or the like which is distinctive in appearance from the remainder or central portion of the plate.

I claim:

1. The combination with a vehicle frame and a running gear frame, of a pair of bumpers each supported separately from the two frames and one being within the other projecting from the ends of the frames.

2. In a vehicle bumper, the combination with the vehicle and running gear frames, of a resilient member pivoted at one end to the vehicle frame extending forwardly in advance thereof and bent downwardly below the running gear frame, a loose connection between the lower end of this member and the running gear frame, and a bumper bar at the front of the member.

3. The combination with a vehicle having a main frame and a relatively movable running gear frame, of a bumper bar in advance of the frames, and means for supporting the bar comprising a pair of U-shaped members each connected at the upper end to the vehicle frame and having a loose connection at the lower end with the running gear frame.

4. The combination with a vehicle frame and a running gear frame therefor, of a pair of bumpers supported one in advance of the other at the front of the frames and each having a separate pivotal connection with the vehicle frame and a swinging connection with the running gear frame, whereby the action of the bumpers is cumulative when the first one is depressed a predetermined amount.

5. The combination with a pair of vehicle side frames, of a bumper having pivotally supported arms, means for attaching the extremities of the arms to each of the side frames, said means comprising a pair of plates engaging opposite sides of each side frame with a projection above the frame, and cross bolts attaching the plates together above and below the side frame with a cross bolt extending between the projections of the said plates and forming the pivot for the said arm.

6. The combination with a running gear frame and a spring supported vehicle frame above it, of a pair of bumpers each separately and independently connected to the vehicle frame and to the running gear frame, and capable of separate movement, and resilient means interposed between the separate bumpers.

7. The combination with vehicle and running gear frames, of a cross piece at the front of the frames, a pair of separately movable bumpers mounted one in advance of the other in front of the frames, and pressure resisting devices interposed between the bumpers and between the inner bumper and the said cross-piece.

8. In a bumper of the class described, the combination with a bumper member and a supporting member at an angle thereto, and a double U-clamp for attaching the bumper and supporting members together.

9. The combination in a bumper, of a pair of members at an angle to each other, and a one piece clamp fitting over one member and around the opposite side of the other one and extending around it to the opposite side of the first member, and a cross piece connected between the extremities at the side of the first named member.

10. In a bumper, the combination of a pair of members arranged at an angle to each other, and a clamp for fastening them together, the clamp comprising double U-shaped portions with arms connected by a cross piece and a separate bar connecting the free ends of the other arms.

11. A bumper comprising a pair of vertically disposed U-shaped supporting members, a bumper member separately secured to each U-shaped member, and means connecting the buffer members permitting a separately yielding movement of each bumper member.

12. The combination with a vehicle frame, of a pair of bumpers disposed one within the other in front of the frame, and means for separately supporting each bumper from the frame, said means comprising a clamp on the frame, a separate supporting arm for each bumper, and a pair of pivoting supports carried by the clamp engaging and pivoting the extremities of the arms.

13. The combination with a double bumper, of a clamp therefor comprising a plurality of pairs of bolts spaced apart and adapted to be disposed at opposite sides of a supporting frame, means connecting the bolts of each pair together on one side of a supporting frame, and a plate engaged by the bolts at the opposite side of a frame, the plate having means for connecting the ends of the double bumper thereto.

EDWARD A. BANSCHBACH.